Jan. 2, 1940.   H. C. DRAKE ET AL   2,185,589
RAIL FLAW DETECTOR MECHANISM
Filed May 20, 1936

INVENTORS
Walter M. Perry & Harcourt C. Drake
BY Joseph H. Lipschutz
ATTORNEY

Patented Jan. 2, 1940

2,185,589

UNITED STATES PATENT OFFICE 2,185,589

RAIL FLAW DETECTOR MECHANISM

Harcourt C. Drake, Hempstead, and Walter M. Perry, Brooklyn, N. Y., assignors to Sperry Products, Inc., Brooklyn, N. Y., a corporation of New York Application May 20, 1936, Serial No. 80,746

9 Claims. (Cl. 175—183)

This invention relates to rail flaw detector mechanisms and is particularly adapted for use upon Sperry rail fissure detector cars. These cars operate upon the principle of sending current through the rail progressively to establish an electromagnetic field surrounding the same and then detecting any distortions in the said field due to the presence of internal defects. Said detection is accomplished by one or more pairs of induction coils which are caused to travel over the rail at a constant distance therefrom. One of the major difficulties experienced in rail flaw detection has its origin in the fact that other things besides internal defects within the rail cause distortion of the electromagnetic field and hence affect the inductive pick-up so that apparently internal defects are indicated where no such defects exist. One of the chief causes of such false defects is the fact that current is passed through the rail by means of contact brushes for setting up the electromagnetic field and it is impossible for these brushes at all times to maintain perfect contact with the rail. Thus, because of dirt spots or the presence of other foreign matter, as well as vibration, the current brushes at times lose contact or make poor contact with the rail, and it is found that this results in the establishment of local magnetic poles in the surface of the rail. There are other causes, also, for setting up such local magnetic poles. Such poles affect the inductive pick-up to change the lines of flux threading therethrough and thus give an indication of the presence of a defect in the same manner as an internal defect within the rail. It is difficult at times to differentiate the indications caused by the local magnetic poles from those due to internal defects and testing is thus rendered inefficient and inaccurate by reason of the multiplicity of false indications.

It is the principal object of our invention, therefore, to provide mechanism which will operate to eliminate the effect of said magnetic poles on the inductive pick-up. We have disclosed various forms of our invention but all of them operate upon the same principle, namely, that local magnetic poles may be eliminated by momentarily and repeatedly disturbing the molecules in the region affected.

Further objects and advantages of this invention will become apparent in the following detailed description thereof:

In the accompanying drawing.

Figure 1:
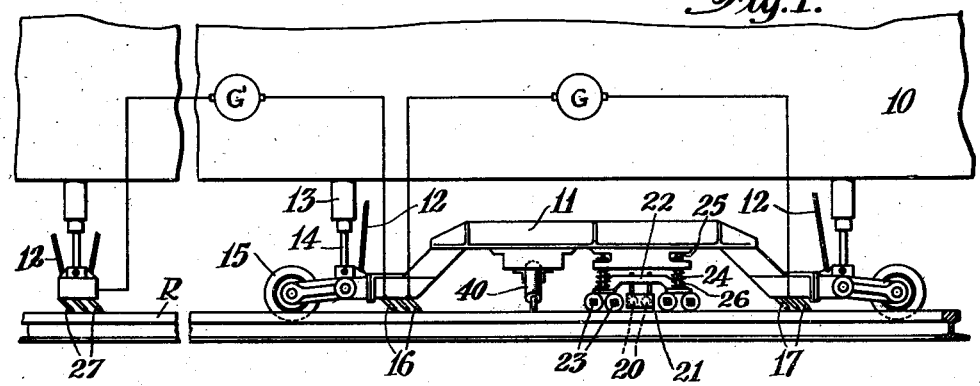
Fig. 1 is a side elevation of a portion of a Sperry rail fissure detector car showing one form of the invention applied thereto.

Referring to Fig. 1 of the drawing, there is shown a portion 10 of the car-body of a Sperry rail fissure detector car, said car being supported on the rails in the usual manner by trucks, not shown. The rail fissure detector mechanism is suspended from said car and may comprise a main current brush carriage 11 normally adapted to be held in raised or ineffective position out of engagement with the rail R by means of retractile springs, not shown, and cables 12. When it is desired to lower the mechanism into effective operating position in engagement with the rail, fluid pressure is supplied to a pair of cylinders 13 to depress pistons 14 which are connected at their lower ends to the carriage 11. Said carriage may be supported on the rail by means of flanged wheels 15 and is adapted to pass current through the rail by means of sets of brushes 16 and 17 spaced apart and supplied with current from a generator G within the car body. An electromagnetic field is thus established surrounding the rail between brushes 16 and 17 as the car moves along the rail. The said electromagnetic field will be uniform except in the region of flaw where it will be distorted. Such distortions may be detected by flux responsive means which may take the form of a pair of induction coils 20 supported at a fixed distance above the rail by being mounted in a housing 21 fixed to a detector carriage 22 adapted to ride on the rail by means such as wheels 23. Said carriage is supported on the main current brush carriage 11 by means such as loosely fitting bolts 24 held in position by means of nuts 25 and springs 26. It will be seen that by this construction, as the car moves along the rails, the pair of coils 20 will normally cut the same number of lines of force, and since they are adapted to be oppositely wound and connected together they will not be affected by variations in current from the supply source. When, however, a region of flaw is encountered, first one and then the other of the coils will enter said region to cut a different number of lines of force and generate a differential E. M. F. which after being suitably amplified may be caused to operate any suitable indicator, such as a recorder.

In addition to the sets of current brushes 16 and 17 a set of brushes 27 may be provided in advance of the leading brushes 16 and supplied with current either from an additional generator G' or from another winding on generator G to establish a circuit from brushes 27 to brushes 16 through the rail in advance of the circuit between brushes 16 and 17 and in the same direction so as to premagnetize the rail and thus place the molecules in homogeneous relationship so that fissures may be more easily detected.

The multiplicity of brushes 27 and 16 in advance of the detector coils 20 results in the establishment of many local magnetic poles for the reasons fully set forth in the introduction, namely, poor contact. Also, local poles are found to exist in the rail for other reasons, such as blows delivered to the rail. All of these local poles obviously distort the electromagnetic field to affect the inductive pick-up so that they are indicated in the same manner as internal defects. We have found, however, that such local magnetic poles may be eliminated if the molecules in the region of said poles are momentarily disturbed a plurality of times. Therefore we have provided various means resulting in repeated momentary disturbances of the molecules in advance of the inductive pick-up, so that said magnetic poles are eliminated by the time said pick-up passes over the region where they were located. One such means for repeatedly disturbing the molecules may take the form of a hammer 40 which may be either of the electric type and supplied with current from generator G or of the pneumatic type and supplied with fluid pressure from the same source as used in cylinders 13. Said hammer delivers a large number of blows in rapid succession to the rail as the car passes along the rail, and since the hammer is located back of the set of brushes 16 and in advance of the inductive pick-up it will eliminate the local magnetic poles before said inductive pick-up can reach them.

Figure 2:
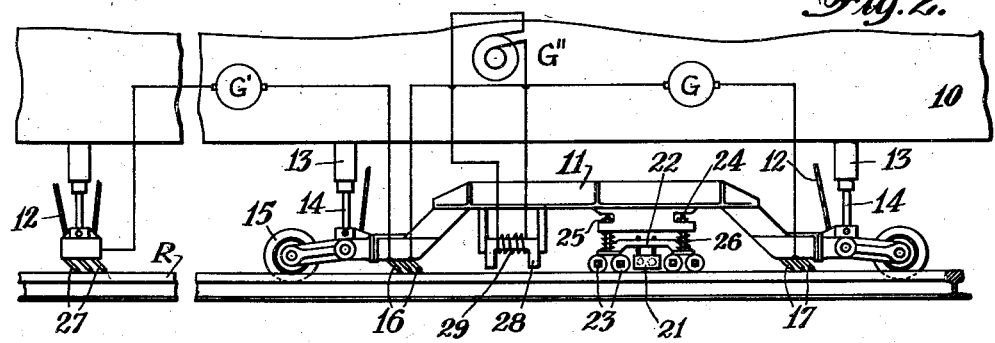
Fig. 2 is a view similar to Fig. 1 showing another form of the invention.

In another form of the invention, shown in Fig. 2, the hammer is replaced by a local A. C. circuit consisting of a source G'' of alternating current supplying current to an A. C. magnet 28 which may be supported from carriage 11 in any suitable manner, the said magnet 28 having a core in the form of an inverted U extending through a coil 29. The ends of the U-shaped core adjacent the rail form a path for A. C. flux. The alternating flux passes rapidly in opposite directions through the rail in advance of the induction pick-up coils 20. If the frequency of the current is high enough the flux can be kept at the surface because of the well-known "skin effect" so as to wipe out the local magnetic poles in the surface.

Figure 3:
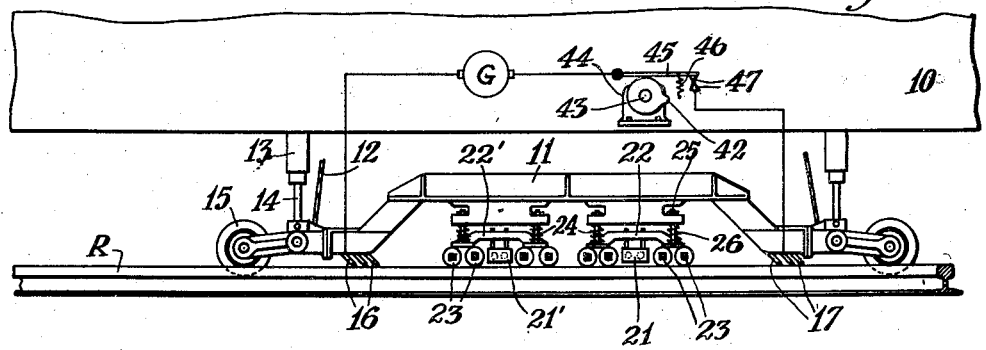
Fig. 3 is a view similar to Figs. 1 and 2 showing still another form of the invention.
Figure 4:
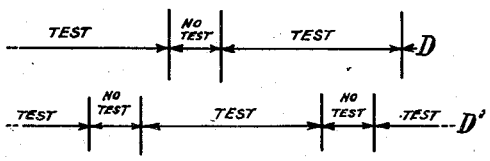
Fig. 4 is a graph illustrating the operation of the Fig. 3 form of the invention.

In another form of the invention disclosed in Fig. 3, means are provided for intermittently breaking the circuit between brushes 16 and 17 at intervals. Such breaking and reestablishment of the circuit causes the necessary momentary disturbance of the molecules and will wipe out the local magnetic poles. Such intermittent breaking of the circuit may be accomplished by means of a cam 42 carried on the shaft 43 of a motor 44 and serving to lift the contact arm 45 against the action of a spring 46 to break a set of contacts 47 in the circuit from generator G through brushes 16 and 17. The periodic breaking and making of this circuit provides the necessary disturbance of the molecules to wipe out the local magnetic poles. Since during the interval that the contacts 47 are open the current falls off in the rail and testing is not possible, there is a certain dead spot which would normally remain untested. This is shown in the diagram D of Figure 4 and shows the portion tested while the contacts are closed and the portion that remains untested while the contacts are open. To obviate the situation wherein a plurality of portions of the rail remained untested we have provided a second inductive pick-up unit mounted on a carriage 22' and similar to the unit carried by detector carriage 22 and similarly mounted upon the current brush carriage 11. The second detector carriage 22' and its inductive pick-up unit in housing 21' are so positioned with respect to the first pick-up unit in housing 21 that the portions which the second unit tests while the contacts 47 remain closed overlap the portions which remain untested by the first unit. This is shown at D' in the diagram of Fig. 4 where it will be seen that the second unit tests a distance which overlaps the portion of the rail not tested by the first unit. The first unit, on the other hand, will test that portion of the rail which remains untested by the second unit. Both inductive pick-ups are connected to the same amplifier so that all portions of the rail will be tested and indicated on the same indicating mechanism.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention what we claim and desire to secure by Letters Patent is:

1. A method of flaw detection which consists in passing current through the rail by inlet and outlet brushes to establish an electromagnetic field surrounding the same, moving a flux responsive device relative to the rail for detecting variations in said field, and eliminating the effect of magnetic poles in the rail surface by momentarily disturbing the molecules of the rail after the inlet brushes and in advance of the flux responsive device.

2. A method of flaw detection which consists in passing current through the rail by inlet and outlet brushes to establish an electromagnetic field surrounding the same, moving a flux responsive device relative to the rail for detecting variations in said field, and eliminating the effect of magnetic poles in the rail surface by periodically disturbing the molecules of the rail after the inlet brushes and in advance of the flux responsive device.

3. A method of flaw detection which consists in passing current through the rail by inlet and outlet brushes to establish an electromagnetic field surrounding the same, moving a flux responsive device relative to the rail for detecting variations in said field, and eliminating the effect of magnetic poles in the rail surface by hammering the rail after the inlet brushes and in advance of the flux responsive device.

4. A method of flaw detection which consists in passing current through the rail by inlet and outlet brushes to establish an electromagnetic field surrounding the same, moving a flux responsive device relative to the rail for detecting variations in said field, and eliminating the effect of magnetic poles in the rail surface by additionally energizing the rail with AC flux after the inlet brushes and in advance of the flux responsive device.

5. A method of flaw detection which consists in passing current through the rail by inlet and outlet brushes to establish an electromagnetic field surrounding the same, moving a flux responsive device relative to the rail for detecting variations in said field, and eliminating the effect of magnetic poles in the rail surface by additionally energizing the rail after the inlet brushes and in advance of the flux responsive device with AC flux of sufficiently high frequency to confine the same near the surface of the rail.

6. In a rail flaw detector mechanism, means including inlet and outlet brushes for passing current through the rail to establish an electromagnetic field surrounding the same, a flux responsive device movable relative to the rail and positioned between said brushes for detecting variations in said field, and means for eliminating the effect on said flux responsive device of magnetic poles in the surface of the rail, said last-named means comprising means positioned between said inlet brushes and said flux responsive device for momentarily disturbing the molecules in the rail.

7. In a rail flaw detector mechanism, means including inlet and outlet brushes for passing current through the rail to establish an electromagnetic field surrounding the same, a flux responsive device movable relative to the rail and positioned between said brushes for detecting variations in said field, and means for eliminating the effect on said flux responsive device of magnetic poles in the surface of the rail, said last-named means comprising a hammer positioned between said inlet brushes and said flux responsive device for periodically disturbing the molecules in the rail.

8. In a rail flaw detector mechanism, means including inlet and outlet brushes for passing current through the rail to establish an electromagnetic field surrounding the same, a flux responsive device movable relative to the rail for detecting variations in said field, and means for eliminating the effect on said flux responsive device of magnetic poles in the surface of the rail, said last-named means comprising means comprising an alternating current circuit including a source of alternating current and means for energizing the rail with AC flux after said inlet brushes and in advance of said flux responsive device for periodically disturbing the molecules in the rail.

9. In a rail flaw detector mechanism, means including inlet and outlet brushes for passing current through the rail to establish an electromagnetic field surrounding the same, a flux responsive device movable relative to the rail for detecting variations in said field, and means for eliminating the effect on said flux responsive device of magnetic poles in the surface of the rail, said last-named means comprising means comprising an alternating current circuit including a source of alternating current and means for energizing the rail with AC flux after said inlet brushes and in advance of said flux responsive device for periodically disturbing the molecules in the rail, said alternating current circuit being of sufficiently high frequency to confine the flux near the surface of the rail.

HARCOURT C. DRAKE.
WALTER M. PERRY.